US006219706B1

United States Patent
Fan et al.

(10) Patent No.: US 6,219,706 B1
(45) Date of Patent: Apr. 17, 2001

(54) ACCESS CONTROL FOR NETWORKS

(75) Inventors: Serene Fan, Palo Alto; Steve Truong, Saratoga, both of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/174,200

(22) Filed: Oct. 16, 1998

(51) Int. Cl.[7] ................................................. G06F 15/173
(52) U.S. Cl. ........................... 709/225; 709/232; 713/201
(58) Field of Search .................................... 709/225, 232, 709/229, 220, 217, 250; 713/201

(56) References Cited

U.S. PATENT DOCUMENTS

| | | | |
|---|---|---|---|
| 5,606,668 | 2/1997 | Shwed | 395/200 |
| 5,896,499 | * 4/1999 | McKelvey | 395/187.01 |
| 5,898,830 | * 4/1999 | Wesinger, Jr. et al. | 395/187.01 |
| 5,951,651 | * 9/1999 | Lakshman et al. | 709/239 |
| 6,009,475 | * 12/1999 | Shrader | 709/249 |
| 6,052,788 | * 8/2000 | Wesinger, Jr. et al. | 713/201 |
| 6,088,796 | * 7/2000 | Cianfrocca et al. | 713/152 |
| 6,098,172 | * 8/2000 | Coss et al. | 713/201 |
| 6,141,755 | * 10/2000 | Dowd et al. | 713/200 |

OTHER PUBLICATIONS

Presentation to Customers (described in attached IDS) Beginning Jul. 17, 1997.
Press Release of Cisco Systems, Inc.; www.cisco.com/warp/public/146/1977.html; Oct. 20, 1997.
World Wide Web Page of Check Point Software Technologies, Ltd.; www.checkpoint.com/products/technology/stateful 1.html; downloaded Sep. 18, 1998.

* cited by examiner

Primary Examiner—Zarni Maung
(74) Attorney, Agent, or Firm—Bever Weaver & Thomas, LLP

(57) ABSTRACT

An access control system (a firewall) controls traffic to and from a local network. The system is implemented on a dedicated network device such as a router positioned between a local network and an external network, usually the Internet, or between one or more local networks. In this procedure, access control items are dynamically generated and removed based upon the context of an application conversation. Specifically, the system dynamically allocates channels through the firewall based upon its knowledge of the type of applications and protocol (context) employed in the conversation involving a node on the local network. Further, the system may selectively examine packet payloads to determine when new channels are about to be opened. In one example, the firewall employs different rules for handling SMTP (e-mail using a single channel having a well-known port number) sessions, FTP sessions (file transfer using a single control channel having a well known port number and using one or more data channels having arbitrary port numbers), and H.323 (video conferencing using multiple control channels and multiple data channels, which use arbitrary port numbers) sessions.

37 Claims, 11 Drawing Sheets

ACCESS CONTROL FOR NETWORKS

BACKGROUND OF THE INVENTION

This invention relates to network firewalls for controlling external access to a particular local network. More particularly, the invention relates to network firewalls having dynamic access control lists.

Firewalls were developed to protect networks from unauthorized accesses. Hackers, corporate spies, political spies, and others may attempt to penetrate a network to obtain sensitive information or disrupt the functioning of the network. To guard against these dangers, firewalls inspect packets and sessions to determine if they should be transmitted or dropped. In effect, firewalls have become a single point of network access where traffic can be analyzed and controlled according to parameters such as application, address, and user, for both incoming traffic from remote users and outgoing traffic to the Internet.

Firewalls most commonly exist at points where private networks meet public ones, such as a corporate Internet access point. However, firewalls can also be appropriate within an organization's network, to protect sensitive resources such as engineering workgroup servers or financial databases from unauthorized users.

Firewalls protect by a variety of mechanisms. Generally, state-of-the art firewall technology is described in "Building Internet Firewalls" by D. Brent Chapman and Elizabeth D. Zwicky, O'Reilly and Associates, Inc. which is incorporated herein by reference for all purposes.

One firewall mechanism involves "packet filtering." A packet filtering firewall employs a list of permissible packet types from external sources. This list typically includes information that may be checked in a packet header. The firewall checks each inbound packet to determine whether it meets any of the listed criteria for an admissible inbound packet. If it does not meet these criteria, the firewall rejects it. A similar mechanism may be provided for outbound packets.

Often, the firewall maintains the access criteria as an access control list or "ACL." This list may contain network and transport layer information such as addresses and ports for acceptable sources and destination pairs. The firewall checks packet headers for source and destination addresses and source and destination ports, if necessary, to determine whether the information conforms with any ACL items. From this, it decides which packets should be forwarded and which should be dropped. For example, one can block all User Datagram Protocol ("UDP") packets from a specific source IP address or address range. Some extended access lists can also examine transport-layer information to determine whether to forward or block packets.

While packet filtering is a very fast firewall technology, it is not, unfortunately, very good at handling protocols that create multiple channels or do not necessarily employ well-known port numbers. A channel is typically defined by a source address, a destination address, a source port number, and a destination port number. In Transport Control Protocol ("TCP"), a channel is referred to as a connection. For some protocols, such as SMTP (electronic mail), only a single well-known destination port is used. Conversations involving these protocols involve only a single channel. For such cases, the packet filtering mechanism will include an ACL item defining allowed accesses using the well-known port number. Because this well-known port number never changes, the ACL item can be set initially and left unchanged during the life of the firewall. Other protocols do not necessarily use well-known port numbers. In these cases, the port number is assigned dynamically. That is, for each new session a different port number may be assigned. Obviously, in these cases, a static packet filtering mechanism must either block all use of this protocol or allow all use, regardless of port number. This represents a significant limitation of standard packet filtering mechanisms.

In addition to single channel protocols, a variety of multi-channel protocols are known and others are being developed. For example, the File Transfer Protocol ("FTP") sets up a control channel using a well-known port and a data channel using a variable port number. The control channel is used to initiate the FTP connection between the clients and a server. Via this control channel, the client and server negotiate a port number for a data channel. Once this data channel is established, the file to be retrieved is transmitted from the server to the client over the data channel. Other newer protocols such as the H.323 protocol used for video conferencing employ multiple control channels and multiple data channels such as channels for transmission of audio information and channels for transmission of video information. The port numbers for these data channels can not be known ahead of time. Static packet filtering mechanisms have difficulty handling FTP and most multi-channel protocols.

Another approach to firewall designs is employed in a "Stateful Inspection" firewall provided by Check Point Software Technology Ltd. In this approach, the firewall inspects not only the packet header but also the packet payload. This allows for the possibility of identifying channels in which the port number or numbers are set by the communicating nodes during a conversation. Specifically, the port numbers of channels about to be opened may be specified in the payload or payloads of packets transmitted over a control channel for a conversation. By inspecting packet payloads in a control channel, the firewall can open a temporary channel corresponding to the port numbers agreed upon by the nodes establishing the session. When the session is terminated, the firewall can reseal the channel associated with those port numbers.

Unfortunately, the firewall implemented by Check Point resides on a PC or a workstation host. Such host must be positioned at the interface of a local network and an external network. Typically, it must be used in conjunction with a router. This configuration limits the flexibility and efficiency of the firewall.

For the above and other reasons, it would be desirable to have an improved firewall design.

SUMMARY OF THE INVENTION

The present invention addresses this need by providing an access control system and method for controlling traffic to and from a local network. The system and procedures of this invention are preferably implemented on a dedicated network device such as a router positioned between a local network and an external network, e.g., the Internet, or between one or more local networks. In this procedure, access control items are dynamically generated and removed based upon the context of an application conversation. Specifically, the procedures of this invention may dynamically allocate channels through the firewall based upon its knowledge of the type of application and protocol (context) employed in the conversation involving a node on the local network. Further, the procedure may selectively examine packet payloads to determine when new channels are about to be opened. In one example, the system employs different rules for handling SMTP (e-mail using a single channel having a well-known port number) sessions, FTP sessions (file transfer using a single control channel having a well known port number and using one or more data channels having arbitrary port numbers), and H.323 (video conferencing using multiple control channels and multiple data channels, which use arbitrary port numbers) sessions.

One aspect of the invention pertains to methods of limiting access to a local network. The methods may be characterized by the following sequence: (a) receiving a packet; (b) identifying an application associated with the packet; (c) determining whether the packet possesses a predefined source or destination address or port; (d) determining whether the packet meets criteria for a current state of a TCP or UDP session with which it is associated; (e) determining whether to examine the payload of the packet; and (f) examining the packet payload. The method may also include various other operations such as determining whether the packet sequence number falls within a defined sequence window and determining whether the packet has been received after a predetermined timeout period has elapsed.

The process of determining whether the packet meets criteria for a current state may involve determining whether any state transition associated with a TCP or UDP session follows an expected sequence of state transitions (e.g., a TCP FIN packet is received after a session is open). The process of determining whether to examine the payload may involve determining whether the payload may contain an intrusion signature. In a specific embodiment, that involves determining whether the packet is an FTP packet, an RPC, a TFTP packet, or a SMTP packet. If the system identifies an intrusion signature in the packet payload of such packet, it will drop the packet. The process of determining whether to examine the payload may also involve determining whether an additional channel of unknown port number may be opened (e.g., the connection is an FTP control channel or an H.323 channel when less than all data channels have been opened). Assuming that the system determines that an additional channel could be opened, it examines the packet payload to identify a port negotiation command. If such port negotiation command is detected, the system may dynamically modify an access control list to create a path for the additional channel.

The system may also detect when a packet initiates a new session (e.g., it is a TCP SYN packet). When this occurs, the method may involve (i) creating a state entry (e.g., a data structure) for the new session; and (ii) creating one or more access control items allowing passage of packets from a node identified in the packet initiating the new session.

Another aspect of the invention pertains to network devices such as routers which may be characterized by the following features: (a) two or more interfaces configured to connect with distinct networks or network segments; (b) a memory or memories configured to store (i) one or more access control criteria for allowing or disallowing a packet based upon header information and (ii) information specifying the content of an application conversation; and (c) a processor configured to compare packet header information with the access control criteria and determine whether to examine packet payloads based upon the context of the application conversation. The network device may include an operating system which controls the network device to perform functions necessary to control access to the local network and route network traffic. To facilitate rapid processing of packets, the network device may include at least two processors, at least one of which is associated with one of the interfaces.

The memory may be configured to store the access control criteria in the form of an access control list. It may also be configured to store state information such as the state of at least one of a TCP session and a UDP session. It may further be configured with information specifying the context of an application conversation indicating whether a side channel may be opened for the application.

The processor may be configured to examine packet payloads when context information in the memory indicates that a side channel may be opened. In such cases, the processor may initiate steps to dynamically modify the access control criteria when a new side channel opens.

These and other features and advantages of the present invention will be presented in more detail below with reference to the associated drawings.

DETAILED DESCRIPTION OF THE PREFERRED EMBODIMENTS

1. System Structure and Architecture

Figure 1:
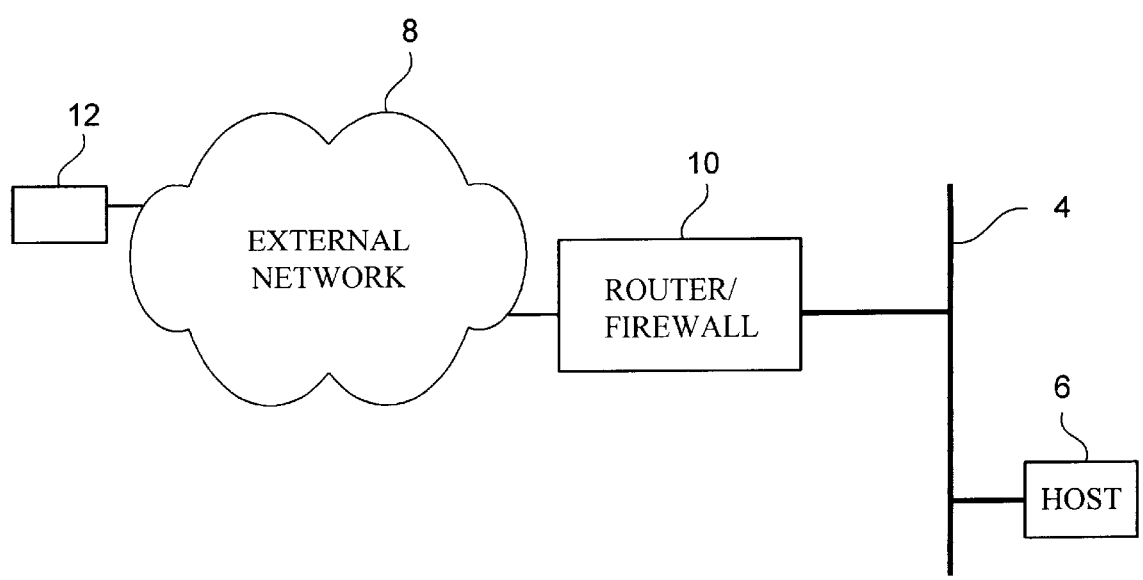
FIG. 1 is a diagram illustrating how a firewall of this invention may be integrated in a network.

FIG. 1 illustrates a general arrangement by which a local network allows its hosts (e.g., a host 6) to communicate with external nodes located on an external network 8 such as the Internet. Typically local network 4 is connected to external network 8 via a router 10 which routes packets between external network 8 and local network 4.

In this invention, router 10 may also double as a firewall that protects local network 4 from potentially dangerous accesses from external network 8. When acting as a firewall, a router 10 will, under certain circumstances, allow host 6 to initiate a conversation with an external node 12 that is connected to external network 8. If router/firewall 10 allows host 6 to initiate such a conversation, it must also allow appropriate return communications from node 12 to host 6. Details of how router/firewall 10 allows such conversations and yet protects the local network will be detailed below, in one embodiment.

Generally, a firewall of this invention may be specially constructed for the required purposes, or it may be a general-purpose programmable machine selectively activated or reconfigured by a computer program stored in memory. The processes presented herein are not inherently related to any particular router or other network apparatus. Preferably, the invention is implemented on a network device designed to handle network traffic. Such network devices typically have multiple network interfaces including frame relay and ISDN interfaces, for example. Specific examples of such network devices include routers and switches. For example, the firewalls of this invention may be specially configured routers such as specially configured router models 1600, 2500, 2600, 3600, 4500, 4700, 7200, and 7500 available from Cisco Systems, Inc. of San Jose, Calif. A general architecture for some of these machines will appear from the description given below. In an alternative embodiment, the firewall may be implemented on a general-purpose network host machine such as a personal computer or workstation. Further, the invention may be at least partially implemented on a card (e.g., an interface card) for a network device or a general-purpose computing device.

Figure 2:
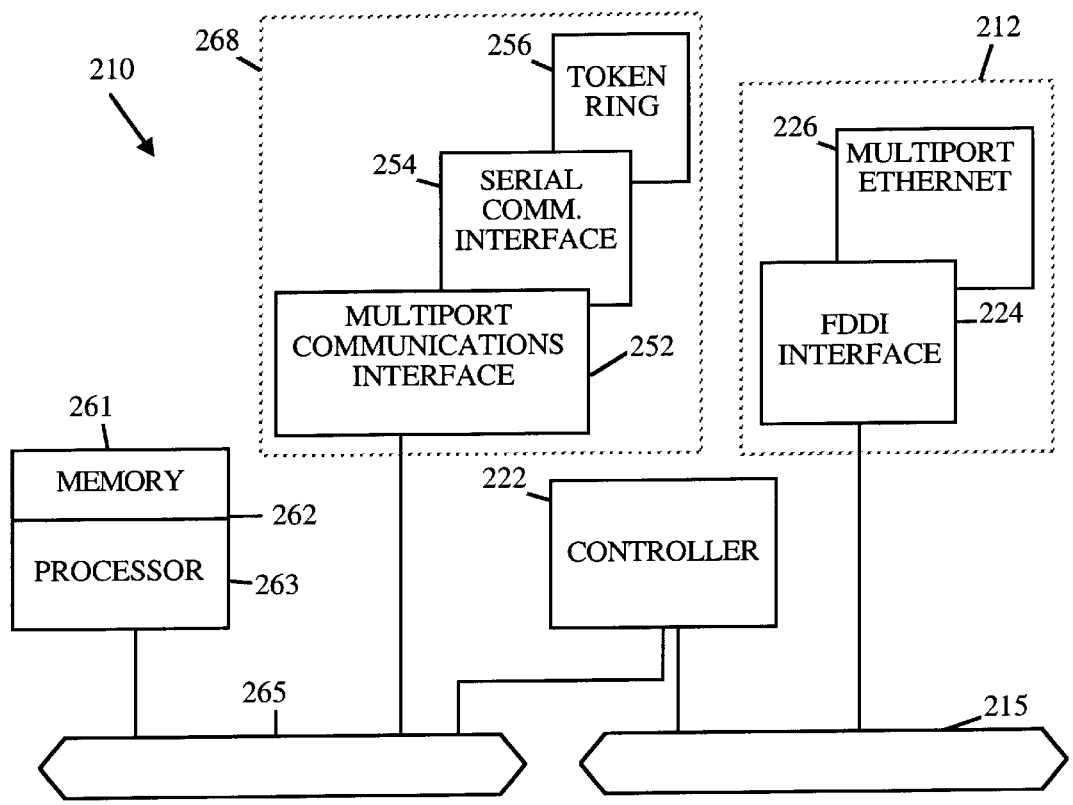
FIG. 2 is a block diagram of a router that may be used in this invention.

Referring now to FIG. 2, a router 210 suitable for implementing the present invention includes a master central processing unit (CPU) 262, low and medium speed interfaces 268, and high-speed interfaces 212. When acting under the control of appropriate software or firmware, the CPU 262 is responsible for such router tasks as routing table computations and network management. It is also responsible for creating and updating an Access Control List, comparing incoming packets with the current Access Control List, generating State Information Structures, inspecting packet headers and payloads as necessary, enforcing the state of a session, etc. It preferably accomplishes all these functions under the control of software including an operating system (e.g., the Internet Operating System (IOS®) of Cisco Systems, Inc.) and any appropriate applications software. CPU 262 may include one or more microprocessor chips 263 such as the Motorola MPC860 microprocessor, the Motorola 68030 microprocessor, or other available chips. In a preferred embodiment, a memory 261 (such as non-volatile RAM and/or ROM) also forms part of CPU 262. However, there are many different ways in which memory could be coupled to the system.

The interfaces 212 and 268 are typically provided as interface cards (sometimes referred to as "line cards"). Generally, they control the sending and receipt of data packets over the network and sometimes support other peripherals used with the router 210. The low and medium speed interfaces 268 include a multiport communications interface 252, a serial communications interface 254, and a token ring interface 256. The high-speed interfaces 212 include an FDDI interface 224 and a multiport ethernet interface 226. Preferably, each of these interfaces (low/medium and high-speed) includes (1) a plurality of ports appropriate for communication with the appropriate media, and (2) an independent processor such as the 2901 bit slice processor (available from Advanced Micro Devices corporation of Santa Clara Calif.), and in some instances (3) volatile RAM. The independent processors control such communications intensive tasks as packet switching, media control and management. By providing separate processors for the communications intensive tasks, this architecture permits the master microprocessor 262 to efficiently perform routing computations, network diagnostics, security functions, etc.

The low and medium speed interfaces are coupled to the master CPU 262 through a data, control, and address bus 265. High-speed interfaces 212 are connected to the bus 265 through a fast data, control, and address bus 215 which is in turn connected to a bus controller 222. The bus controller functions are provided by a processor such as a 2901 bit slice processor.

Although the system shown in FIG. 2 is a preferred router of the present invention, it is by no means the only router architecture on which the present invention can be implemented. For example, an architecture having a single processor that handles communications as well as routing computations, etc. would also be acceptable. Further, other types of interfaces and media could also be used with the router.

Regardless of network device's configuration, it may employ one or more memories or memory modules (including memory 261) configured to store program instructions for the network operations and access control functions described herein. The program instructions may specify an operating system and one or more applications, for example. Such memory or memories may also be configured to store access control criteria (e.g., an ACL), state information (specifying the context of a network session for example), etc.

Because such information and program instructions may be employed to implement the access control systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 3:
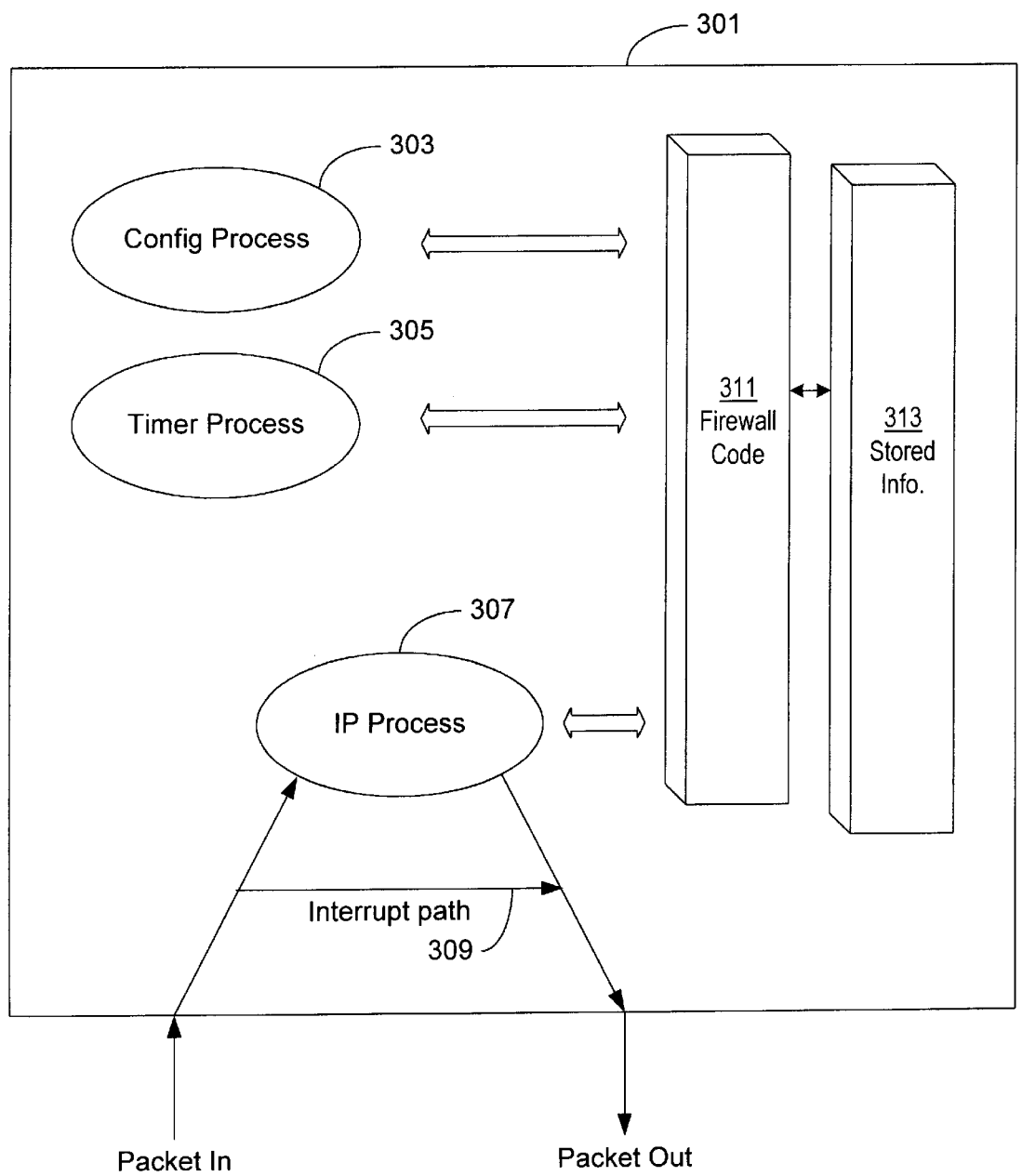
FIG. 3 is a block diagram of a computer architecture that may be employed with this invention.

FIG. 3 is a system diagram of router or other network device 301 that may implement a firewall in accordance with this invention. As shown network device 301 includes various processes and paths that form part of an operating system for the network device. These may include configuration processes 303, timer processes 305, IP processes 307, and interrupt paths 309. IP processes 307 and interrupts 309 are provided for routine packet handling functions as illustrated in the figure. In addition to these processes and paths, network device 301 includes firewall code 311 for executing firewall functions in response to requests from processes 303, 305, and 307 and interrupts 309. In a preferred embodiment, firewall code 311 may include both an engine that handles transport layer functions and various inspection modules, each of which is dedicated to handling a specific application protocol (e.g., FTP, H.323, etc.). In a further preferred embodiment, firewall code 311 is integrated with the remainder of the network device's operating system.

Firewall code 311 may make use of various lists, data structures, and other stored information (collectively indicated by reference numeral 313 in FIG. 3). Examples include access control lists, state information structures (described below), timers, and various lists.

Regarding the operating system, it may require execution of code 311 under various circumstances associated with packet processing. In one example, configuration processes 303 specify that the FTP protocol is to be inspected. Thus processes 303 may ask code 311 to configure an access control list to allow initiation of an FTP session. Timer processes 305 may indicate to code 311 that a particular session has timed out. In this case, the firewall code 311 may delete any state information structure for that session as well as the associated ACL items. Still further IP processes 307 and interrupts 309 may call firewall code 311 during the course of processing a packet to determine whether it meets certain ACL items or to determine whether its payload should be inspected.

2. Firewall Process Overview

Network communications at high levels, such as at the application layer, may be referred to as "conversations." An "application conversation" may have one or many "channels" (also referred to as "sessions" or "socket pairs"). These terms were chosen to cover at least TCP and UDP communications. In TCP, each channel represents a separate "connection." In UDP, which is connectionless, each channel is defined by a unique combination of source and destination IP addresses and port numbers. All UDP packets received within a defined timeout period and having the same unique combination of addresses and port numbers are deemed to belong to the same session or channel.

An application conversation may include only a single well-known channel as in the case of SMTP, HTTP, and Telnet or it may contain many channels as in the case of certain multimedia applications (e.g., H.323 and RealAudio). Still other application conversations may have variable numbers of channels as in the case of FTP and TFTP which create a new data channel each time a different file is transferred from server to client. The present invention handles all of these situations.

Like packet filtering, the access control of this invention examines network and transport-layer information. In addition, it examines application layer protocol information (such as FTP) to learn about and inspect the state of TCP or UDP sessions. This mechanism dynamically creates and deletes temporary openings in the firewall by temporarily modifying access lists to change packet filtering criteria. Preferably, the dynamically created access control list items are stored in memory in the network device's network interface. A firewall of this invention may also maintain state information in its own data structures (referred to herein as State Information Structures or "SISs") and use that information to create the temporary entries (by dynamically modifying its ACL, for example). Thus, a firewall may retain state information that is not retained in the access list entries. A firewall may inspect each packet within a data flow to ensure that the state of the session and packets themselves meet the criteria established by a user's security policy. State information is used to make intelligent permit/deny decisions. When a session closes, its temporary ACL entry is deleted, and the opening in the firewall is closed.

A firewall may monitor each application on a per-connection basis for comprehensive traffic control capability. The firewall watches application sessions, notes the ports each session is using and opens the appropriate channels for the duration of the session, closing them when the session is finished. Specifically, when a newly authorized session is registered, the system may create a new SIS and any new ACL items for the session. Thereafter, packets transmitted to and from the hosts involved in the connection are allowed to pass back and forth across the firewall so as long as the ACL items allow a transmission.

The firewalls of this invention preferably consider the TCP or UDP session state. In fact, a firewall may base decisions on the state of its sessions. To do so, it may maintain a record of the state of each connection going through. Also, the firewalls preferably keep track of items such as: how long was the last transmitted packet in this session, are the sequence/acknowledgment numbers climbing as expected, was the session initiated from the inside or outside, is the session still open or has it been closed, and what port or ports are the return data channels using?

The firewalls of this invention may enable a firewall to support protocols that involve multiple data channels created as a result of negotiations in the control channel. As mentioned, many Internet and multimedia applications that use a "well-known" port address to open an initial control connection often use different, dynamically chosen ports for data traffic. It is impossible to predict which ports these applications may use in a given connection, and some of them may use multiple channels over several ports. Thus, depending upon the type of application conversation, the firewall may also monitor the payloads of the packets it allows to pass. This may be the case when, for example, a control channel connection is in a state in which ports for additional channels are negotiated over a control channel. This allows the firewall to determine which additional channels should be dynamically opened to the firewall.

Security Access Policy

Initially, an administrator or other authorized person may create a "security access policy" for the firewall. The purpose of this policy is to generally define how to protect the local network. Often the policy will protect the network from all uninvited sessions initiated externally. In such cases, the policy may specify which local nodes may participate in conversations outside the local network and the protocols under which those conversations may take place. In addition, the security access policy may specify particular times when access will be permitted to particular users operating under particular protocols. For example, it may be desirable to provide a security access policy in which certain users cannot communicate outside the local network during nonbusiness hours.

A security access policy typically will specify that few if any uninvited packets from outside the local network are permitted to enter. Then when a local node initiates a conversation with an external node, the firewall must anticipate that packets in response will be addressed to the local node. It does this by adjusting its ACL to include items allowing passage of certain packets having the external node's address.

While a typical security access policy will allow no uninvited packets from external sources, some policies may allow some limited conversations initiated by external nodes. Such policies may place restrictions on the protocols that could be used by any external nodes initiating a conversation.

Various combinations of matching (or not matching) packet header fields can be used to support a policy. Examples of specific fields that may be examined include IP destination address, IP source address, IP protocol field, TCP source port, TCP destination port, TCP flags field, SYN alone for a request to open a connection, SYN/ACK for a connection confirmation, ACK for a session in progress, and FIN for session termination. All or some of that information may be compared against an ACL and/or used by the firewall engine to determine whether the packet is appropriate given the current state of the session.

In a specific example, an access control list item may specify the addresses of the communicating hosts (or the sub-networks of one or both of these hosts) and the protocol under which they communicate (identified by a port number for example). More specifically, for example, if the security access policy prevents SMTP sessions initiated from IP host 1.1.1.1. with a destination address 2.2.2.2. then the packet filter would discard packets that have IP destination address=2.2.2.2., IP source address=1.1.1.1., IP protocol=6 (for TCP), and Destination port=25 (for SMTP). Such criteria may represent static Access Control List items.

The access policy may also restrict a given interface on the router or other network device implementing the firewall of this invention. The interface may specify a particular type of media such as FDDI, Ethernet, Token Ring, etc. Other fields may be considered; the policy may add a check "ACK bit not set" to guard against the connection being a non-SMTP connection initiated outgoing from port 25, for example.

Similarly, packet filters may be employed for other protocols such as Novell IPX and Apple Talk protocols, because their formats are well documented and understood.

Process Flow Details

Figure 4:
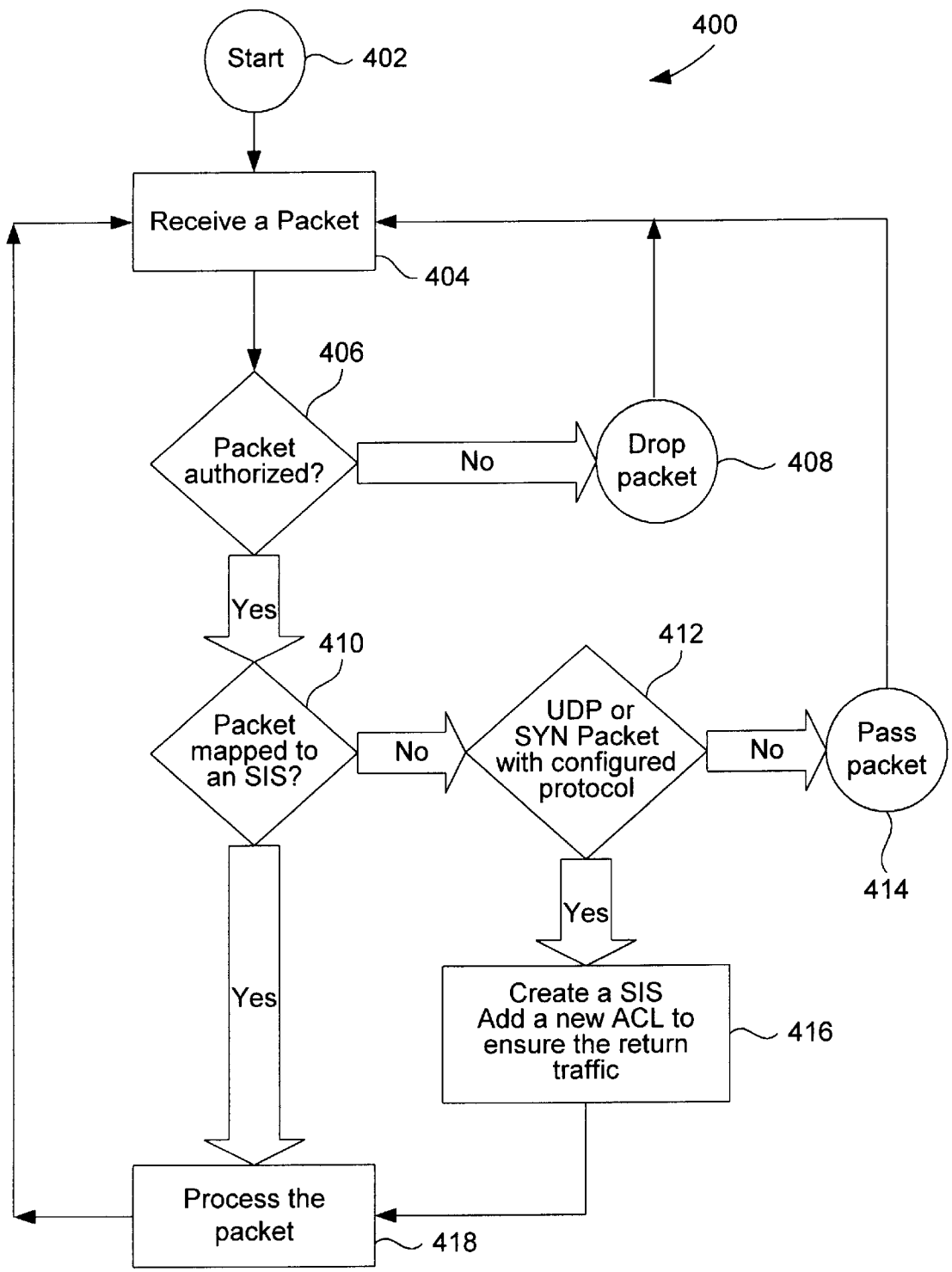
FIGS. 4–8 are flow charts depicting a preferred method by which the firewalls of this invention may protect a local network.

One implementation of the present invention is detailed in the process flow charts depicted in FIGS. 4–8. FIG. 4 presents a high level overview of the process. This particular implementation of the process is referred to by a reference number 400. The process begins at 402 and receives a new packet at the firewall at a step 404. Note that a packet may be associated with a session that has "timed out." Timeout criteria are further detailed in a process flow diagram presented in FIG. 7. Briefly, if there is too much time between receipt of consecutive packets belonging to the same session, the firewall will not allow the subsequent packets of the session to pass.

Assuming that the current packet meets the timeout criteria, the firewall next determines whether it meets additional authorization criteria at a decision step 406. These criteria may include such items as the time of day when packets can be sent, source and destination IP addresses, protocols to which the packets may belong (identified by port numbers), and combinations thereof. Such authorization criteria may take the form of ACL items. Most, if not all, of this information may be obtained by examining the packet header in the manner of a traditional packet filter. The ACL items may be divided into static items and dynamic items. Static items usually result directly from the user's security access policy (as described above). Dynamic items may be generated on the fly, typically to allow return traffic for sessions or applications initiated with nodes on the local network.

If the firewall determines at decision step 406 that the packet is not authorized, it drops the packet at step 408. Optionally, the packet is logged at this point. If, on the other hand, the firewall determines that the packet is authorized at decision step 406, it next determines whether the packet is mapped to a currently existing state information structure ("SIS"). As detailed below, these are data structures that maintain "state" information about a currently existing session.

If the firewall determines that no corresponding SIS exists for the current packet, it next determines whether the packet is a UDP or a TCP SYN packet of a configured protocol at a decision step 412. For TCP protocols, a request for a new connection is made with a SYN packet. If the firewall determines that the current packet is not a UDP packet or a TCP SYN packet of a configured protocol (i.e., decision step 412 is answered in the negative), it simply passes that packet on to the destination. If, on the other hand, the firewall determines at decision step 412 that the current packet is in fact a UDP or TCP SYN packet of the appropriate protocol, it realizes that a new connection is being opened and should be watched. Therefore, it creates a new SIS at a step 416. It concurrently adds any necessary ACL items to ensure that return traffic (from the destination) can pass through the firewall, assuming that such return traffic meets other security criteria. The steps of creating a new SIS and associated ACL items will be further detailed in a process flow chart depicted in FIG. 6.

Note that not all protocols are necessarily monitored as sessions (configured protocols). The network administrator may decide that some protocols (e.g., HTTP) need not be monitored. For such protocols, the firewall understands that no SIS need be created when it encounters a packet of such protocol. It simply passes the packet as indicated in step 414. This does not necessarily create a security issue as the packet must still be authorized at step 406.

After the firewall creates the new SIS and associated ACL items at step 416, it further processes the packet at a step 418. Similarly, if the firewall determines that the packet it receives is currently mapped to an SIS at decision step 410 (i.e., decision step 410 is answered in the affirmative), it processes the packet per step 418. Step 418 is further detailed in FIG. 5. After the packet has been processed according to this procedure, the firewall directs process control back to step 404 where it awaits the next packet.

Figure 5:
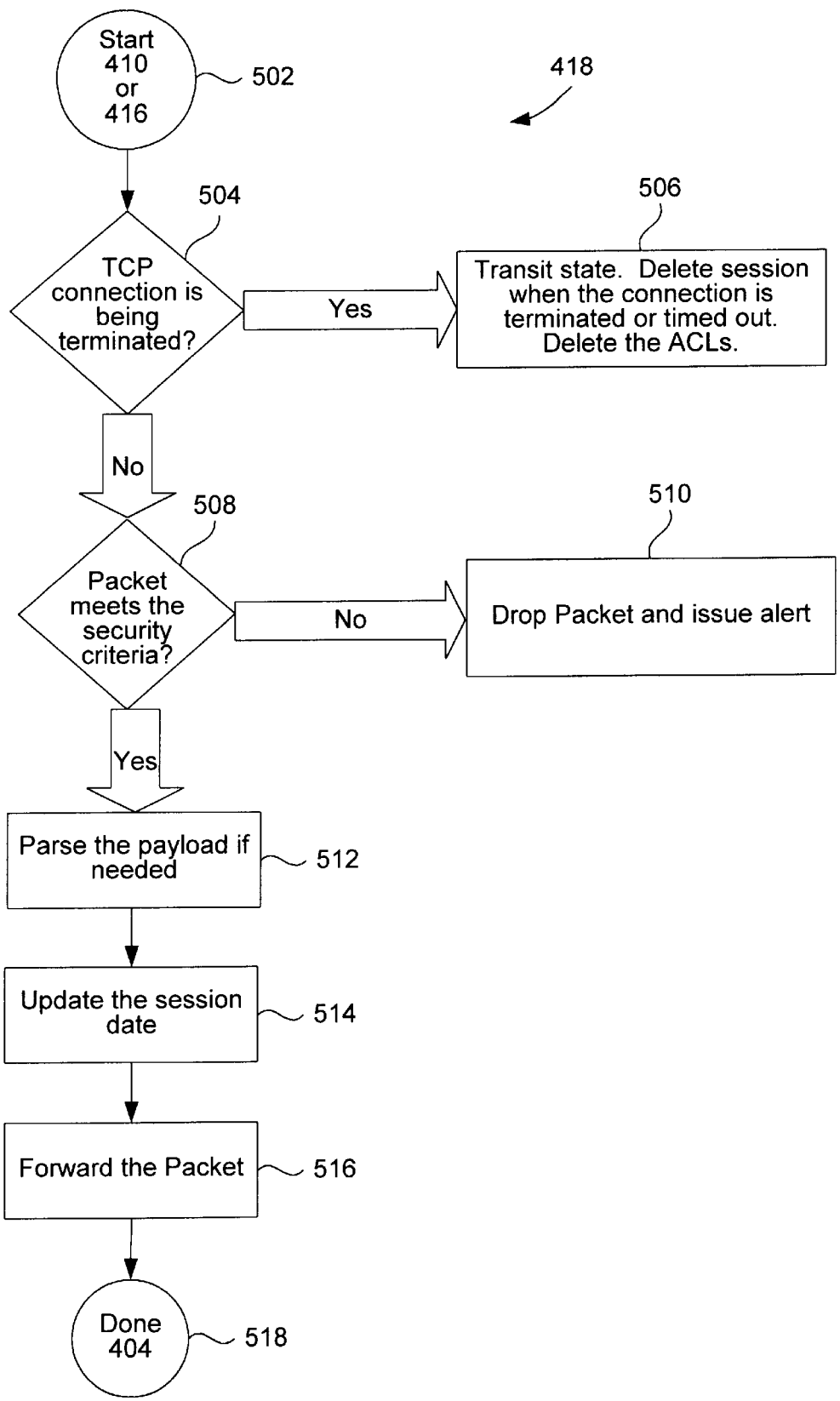

Turning now to FIG. 5, the process associated with step 418 is detailed. This process begins at 502 (corresponding to either step 410 or step 416 in process 400) and follows with a decision step 504 in which the firewall determines whether a TCP connection is being terminated. This is determined by simply identifying an appropriate termination flag in the packet header. These flags may be either the finish (FIN) flag or the reset (RST) flag. Assuming that the firewall determines that the TCP connection is being terminated, it then transitions to a closing or closed state at a step 506. At the appropriate time or upon receipt of a final packet for the connection, the SIS for that connection is terminated and the associated ACL items for that connection are also deleted. At this point, the system may also provide an audit trail which details connections by recording time stamps, source hosts, destination hosts, ports, total number of bytes transmitted, etc.

If the firewall determines at decision step 504 that the TCP connection is not to be terminated, it next determines whether the packet meets certain security criteria at a step 508. It may do this by examining the packet header. These security criteria are typically associated with the particular session to which a packet may belong. Examples include ensuring that the packet sequence number falls within a defined range of sequences (a "sequence window"), the packet type is as expected for a given session state, and the packet header meets ACL items associated with the particular session. The state of a given session may be enforced by ensuring that state transition packets arrive in the expected order (e.g., a SYN packet is not received while a TCP session is in an "open" state.) If the firewall finds that the current packet does not meet the criteria specified at step 508, it drops the packet and optionally issues an alert at a step 510.

Assuming that the packet meets the security criteria, as determined at step 508, the firewall next parses the packet payload if necessary as indicated at process step 512. The parsing procedure is further detailed in a flow chart depicted in FIG. 8. After the payload parsing is completed, if needed, the firewall may next update the current session state at a step 514. It may do this if the current packet indicates a state transition.

In one specific embodiment, there are four states for a TCP connection: closed, opening, open, and closing. The transition between closed and opening may occur when a SYN packet is received for a new session. The transition between opening and open states may occur when a SYN/ACK packet is received. The transition to a closing state may occur when a FIN packet is received. Finally, the transition to the closed state may occur upon receipt of a reset packet. In a specific embodiment, UDP communications include the following states: opening, open, and closed. The transition to opening occurs when a first UDP packet for a new session is received. That is, when a UDP packet is received for which there is no existing SIS. The transition from opening to open occurs when the first reply packet to an initial UDP packet is received. The transition to closed occurs when a UDP session times out.

Note that in step 508, the system may drop the packet if it does not meet expected state criteria. Such criteria may require that state transitions follow an expected sequence: e.g., closed, opening, open, and closing for TCP sessions. The system might then drop FIN packets received while a TCP session is in the closed state or it might drop SYN packets while a TCP session is in the open or closing state.

Step 514 may also involve updating the sequence window for a current session based upon the sequence number of the current packet. The size of the sequence window may be dictated by the network traffic. In a specific embodiment, the sequence window is set at about 1 to 2000 for congested networks and at about 7000 to 9000 for uncongested networks. Preferably, the firewall tracks the sequence number of the packets it receives and the acknowledged sequence number of TCP connections. When the sequence number of a transmitted packet is not in an expected window range as defined based upon the acknowledged sequence window, the packet will be dropped (step 510). The sequence number of the most recent ACK packet may be maintained in the SIS to define the sequence window of allowable packet sequence numbers. Other bookkeeping tasks may be performed at step 514 and updated in the appropriate fields of the SIS.

Finally, after any necessary updates are performed at step 514, the firewall forwards the packet to its destination at a process step 516 and the process is completed at 518 (corresponding to step 404 in process 400).

Figure 6:
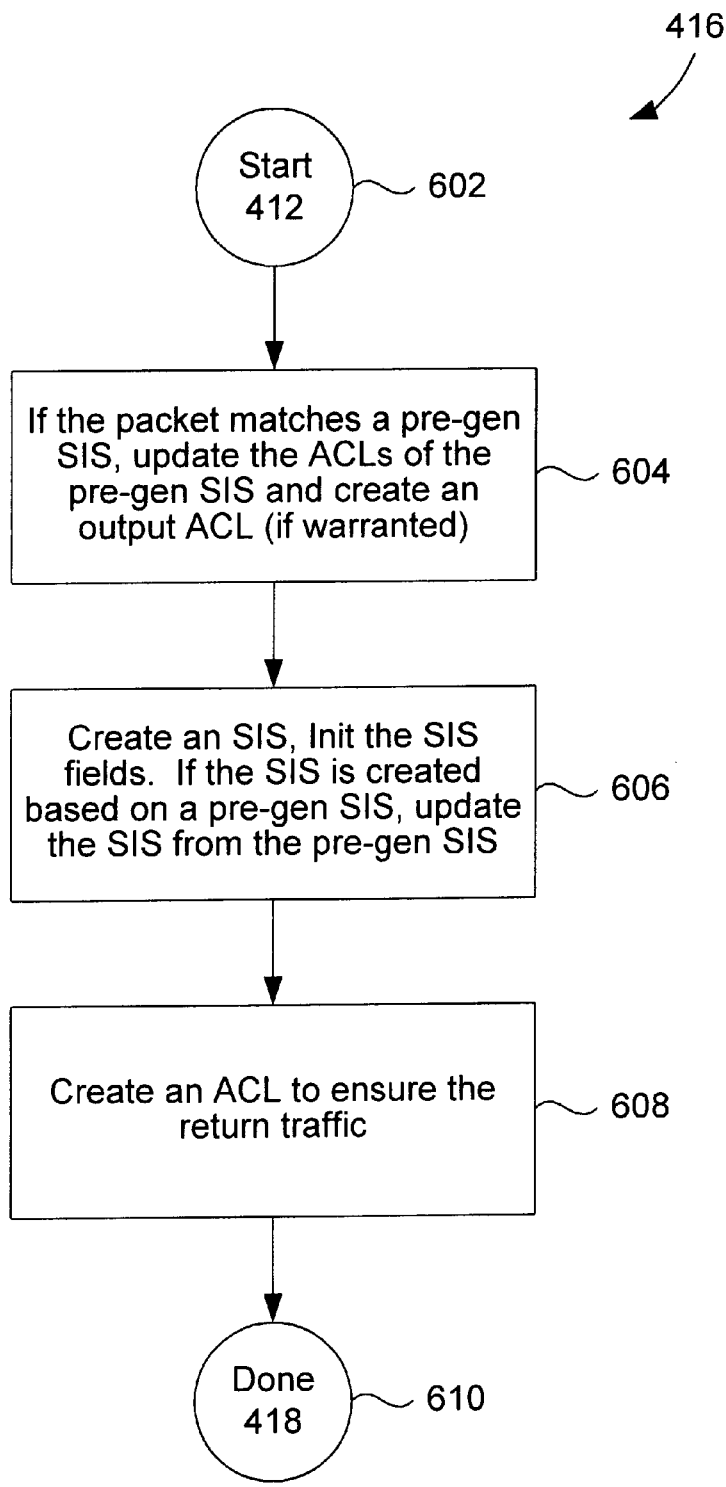

The process associated with creating a new SIS and adding any new ACL items to ensure return traffic (step 416 of process 400) is depicted in FIG. 6. The process begins at 602 (corresponding to decision step 412 of process 400). Then, if the current packet matches a "pre-gen SIS" (described below), the system updates the ACL items of the pre-gen SIS and may create one or more output ACL items (if warranted). This is accomplished at a process step 604.

A pre-gen SIS is created when the firewall determines that a side channel or data channel is about to be opened. As explained below, this determination may be made when packet payloads of certain protocols are examined. When the firewall finds a payload marker suggesting that a side/data channel is about to be opened, it prepares for the new connection (associated with the new channel) by creating a precursor (pre-gen) SIS. At this point, the firewall may only know the destination port (as indicated by a port negotiation command in the payload). The ACL items created for the pre-gen SIS may specify this destination port, but they cannot specify the source port, as this is as yet unknown. The second port can be specified when the firewall receives the SYN packet for the new side channel. Such SYN packet will specify the source port and this information may now be added to ACL associated with the pre-gen SIS at step 604. If the packet under consideration does not match a pre-gen SIS, step 604 is skipped.

Next, at a step 606, the firewall creates a fresh SIS (for a current UDP or TCP SYN packet) and initializes its fields. If the new SIS is created based upon a pre-gen SIS, some of the initial information is taken from the pre-gen SIS. Finally, at a step 608, the firewall creates one or more ACL items to ensure return traffic is permitted for the new session. Note that if a pre-gen SIS existed, the ACLs may have been created at step 604. Without these new ACL items, it is likely that return traffic (presumably from the external network) would be blocked. The new ACL items will typically allow packets from the external node IP address to a local node IP address (as identified in the initial TCP SYN or UDP packet for the SIS) and the associated port number. The process is concluded at 610 (corresponding to step 418 of process 400).

Figure 7:
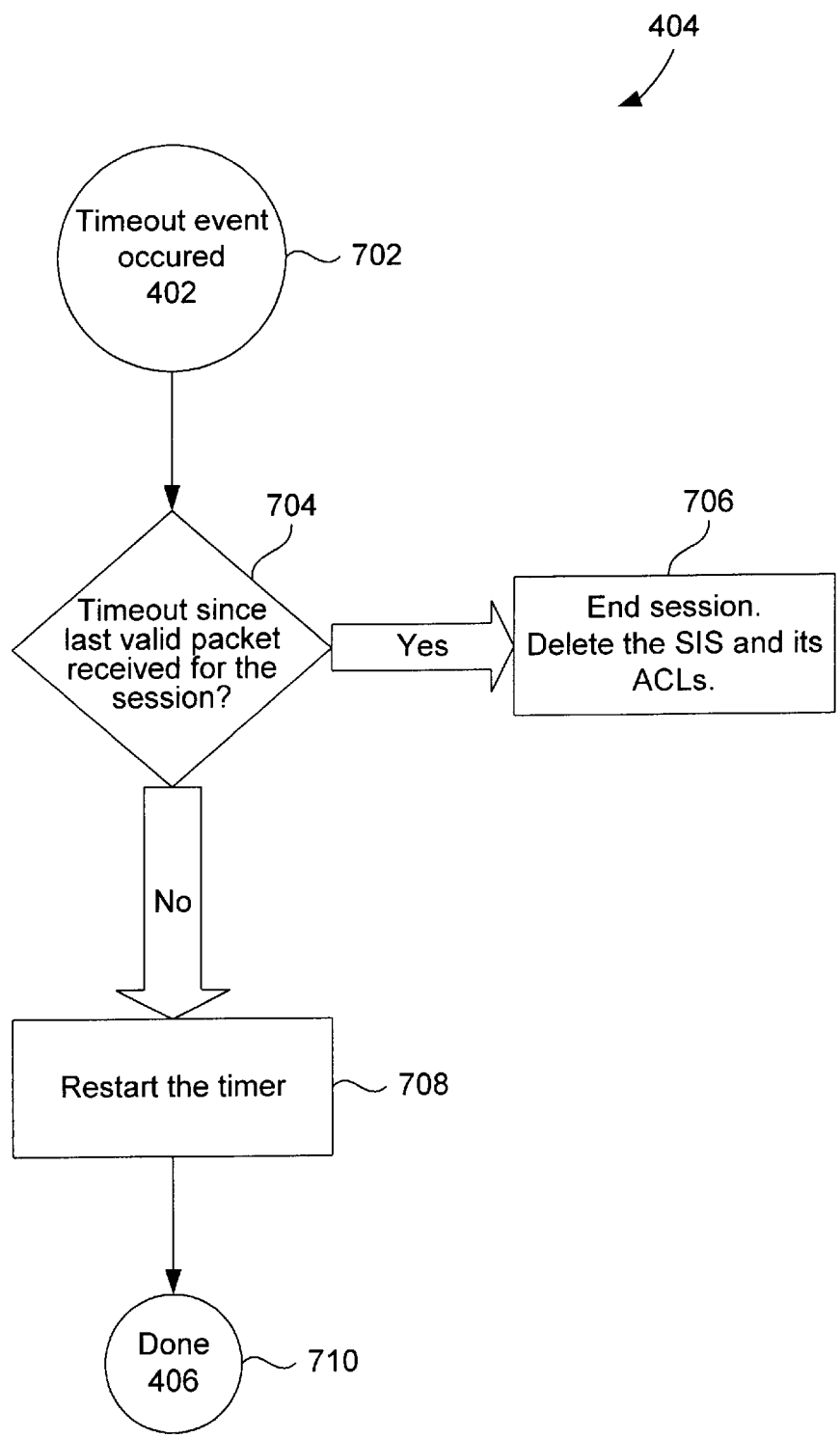

The timeout provisions are detailed in FIG. 7. These provisions were discussed above with reference to step 404 of process 400. Preferably, the timeout provisions are implemented via interrupts and can be triggered at any stage in the firewall process. These provisions are designed to end a session if there is too great a delay between successive packets in that session. Leaving a firewall passage open for too long a time exposes the local network to a potential security problem.

The process begins at 702 (corresponding to step 402 of process 400) and includes a decision step 704 in which the firewall determines whether there has been a timeout since the last valid packet was received for the session represented by an SIS. In a specific embodiment, the timeout is 30 seconds between successive UDP packets and 3600 seconds between successive TCP packets. Preferably, these timeout periods are configurable. If the firewall determines that the timeout period has been exceeded (by receipt of an interrupt for example), it ends the session and deletes the associated SIS and ACL items at a process step 706. If, on the other hand, the timeout period has not been exceeded (decision step 704 is answered in the negative), the firewall restarts the appropriate timer when the next packet for that session is received. See process step 708. The process is then completed at 710 which corresponds to step 406 in process 400.

To provide a flexible but secure firewall, a security algorithm must examine packet payloads. Preferably, the payload is examined under only certain conditions. By preventing the payload from being examined in all cases, the performance of the system is improved. In a preferred embodiment, the payload is only examined under two circumstances. First, the payload may be examined to identify any intrusion signatures. Certain types of intrusion attempts may be detected by comparing payloads with well-known intrusion signatures. In a specific embodiment all packets of FTP, RPC, TFTP, and SMTP are examined for intrusion signatures. Packet payloads of other protocols are not examined for such signatures in this specific embodiment.

Second, the payload is examined when there is a possibility that an additional channel may be opened. When this is a possibility, the firewall of this invention watches packet payloads to determine whether a port negotiation command has been detected. As noted, some application conversations involve multiple channels. Often there are one or more control channels and one or more data channels. H.323 video conferencing, for example, includes up to three control channels and four data channels. One data channel involves transmission of audio data from a first party, another data channel involves transmission of video data from the first party, another data channel involves transmission of audio data from a second party, and the final data channel involves transmission of video data from the second party. Each new data channel includes a port number that can not be known ahead of time. Each new channel requires a dynamic adjustment of the firewall to temporarily allow data to pass via that channel. The generation of a new channel is prefaced by a "port negotiation command" in a control channel.

In a preferred embodiment, only the payloads of control channels are examined for port negotiation commands. This is because data channel payloads do not indicate that additional channels may be opened. Further control channel payloads are examined only when there is a possibility that an additional channel may be opened. In a H.323 conversation, for example, when all seven channels have been opened, there is no need to further monitor the payloads of the control channels. And, in a NetMeeting videoconference, the system preferably inspects the TCP control channel used to establish media channels. This control channel contains information that opens new media channels. The system watches it to identify those ports that media channels use and opens additional channels on a dynamic basis. The media and media control channels for audio and video are not inspected or monitored, because these channels only transport data and cannot open additional channels. This maximizes router and network performance to assure proper delivery of time-sensitive data.

In a specific embodiment, the firewall engine and associated application modules contain the intelligence to know when to watch payloads for new channels. When a port negotiation command is detected, the firewall recognizes that a data channel defined by port numbers for the communicating nodes is about to be established. In the payload, it detects the identity of one port of the data channel through which data will be transmitted in the a first direction. At this point, the firewall of this invention creates an ACL item for that port. The other port number of a new channel is identified in the header of the first packet following a port negotiation command that specifies the negotiated port. That packet is allowed through, and from its port number, the firewall creates another ACL item that together with the previously created ACL item defines the new data channel.

Figure 8:
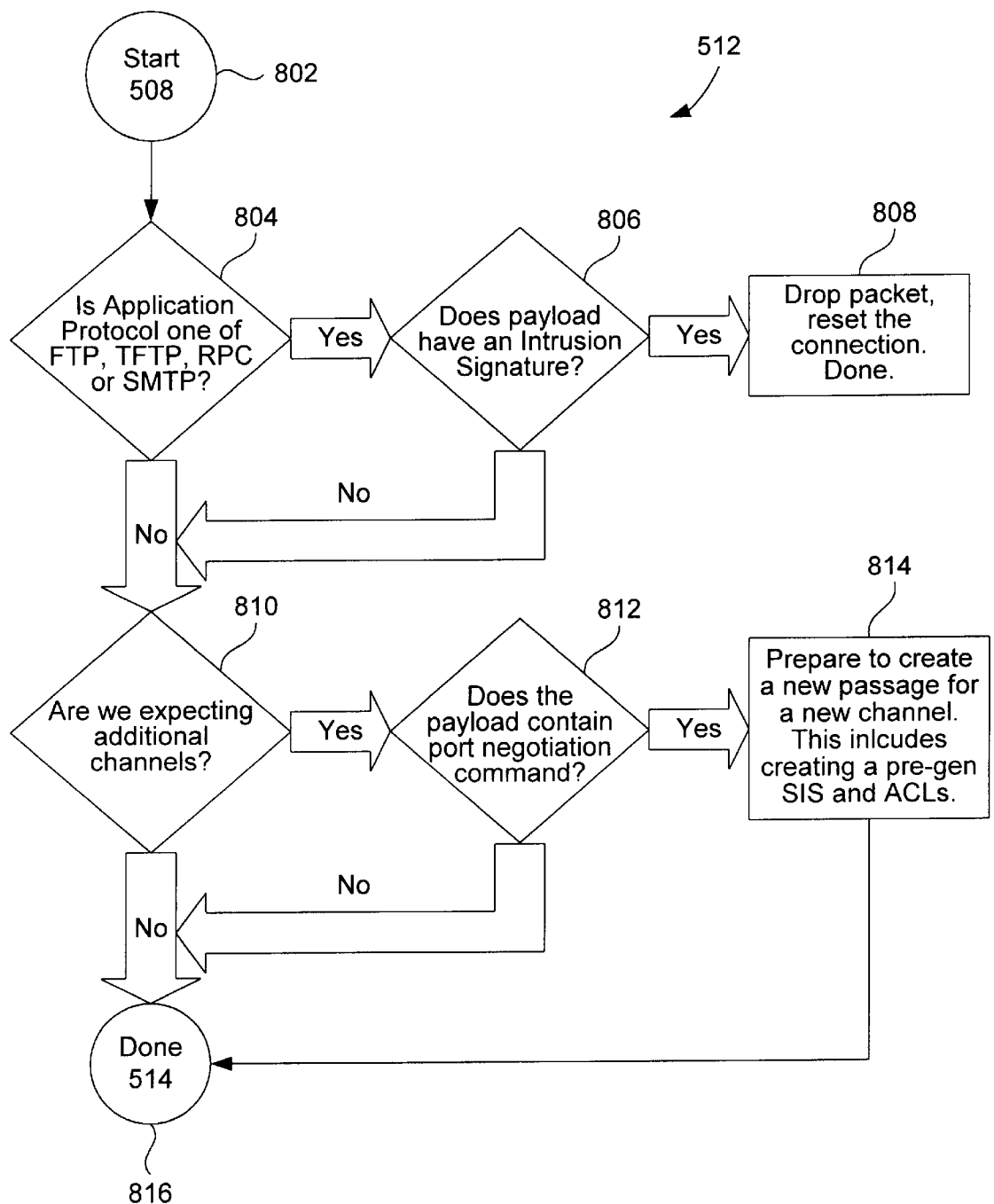

The process of overall process of parsing a payload (step 512 of process 418) is detailed in FIG. 8. As shown there, the process begins at 802 (corresponding to decision step 508 of process 418) and follows with a decision step 804 in which the firewall determines whether the current session is one of the following protocols: FTP, TFTP, RPC, or SMTP. If so, it examines the payload to determine whether it has a specified intrusion signature. See decision step 806. For these protocols, it is understood that certain intrusion mechanisms are known and used to defeat network security. These mechanisms leave certain signatures that can be specified for detection ahead of time. If such intrusion signature is identified at decision step 806, the firewall drops the current packet and resets the connection at a step 808.

Assuming that no intrusion signature is located at decision step 806 or that the protocol of the current packet is not one of FTP, TFTP, RPC, or SMTP, the firewall next determines whether it is expecting additional channels to be opened at a decision step 810. As mentioned, certain types of applications may have multiple channels: typically a control channel and one or more side or data channels. The ports associated with such side or data channels cannot be known ahead of time. At step 810, the system determines whether the packet is associated with an application that could open multiple channels (e.g., FTP or H.323) and, if so, whether any other channels might be opened for that application. As mentioned many applications, such as H.323, have an expected or maximum number of side channels.

Assuming that the application is of a type which may involve additional channels (and not all possible channels associated with that application have yet been opened), the firewall next examines the packet's payload to determine whether it includes a port negotiation command. See decision step 812. Such commands indicate that a new channel is likely to be opened very soon. If the firewall does detect such command at decision step 812, it next prepares to create a new passage for a new channel at a process step 814. This involves creating a pre-gen SIS and associated ACL items as mentioned above. Note that at this stage the ACL items can specify source and destination addresses and possibly a destination port, but usually not a source port. The source port for the channel may be determined when a subsequent SYN packet for the new channel is received. After the appropriate preparations are undertaken, the process is complete at 816 (corresponding to step 514 of process 418). Also, if either of decision steps 810 or 812 is answered in the negative, the process is completed at 816.

Note that firewall only inspects packet payloads in control channels where port negotiation commands may appear. This conserves system resources. Further, only a subset of the packets in a control channel will have their payloads inspected. Most packets include a "command name" which indicates whether the payload is likely to contain port or address information such as a port negotiation command. If the command name is not of a type that could include a port negotiation command, the firewall discontinues its inspection of the payload. This further conserves resources.

3. State Information

As indicated above, the systems and methods of this invention preferably monitor the state of each channel. To accomplish this, they may create an SIS for each channel, even if there are other channels associated with the application. The firewall engine (and/or associated application modules) uses its knowledge of the expected behavior in each state to analyze packet headers and determine whether the current packet comports with what it expects in the current state. If a packet is not of the type expected given the current state, the firewall will drop it because it may be an illicit packet masquerading as a packet of a current session.

Figure 9:
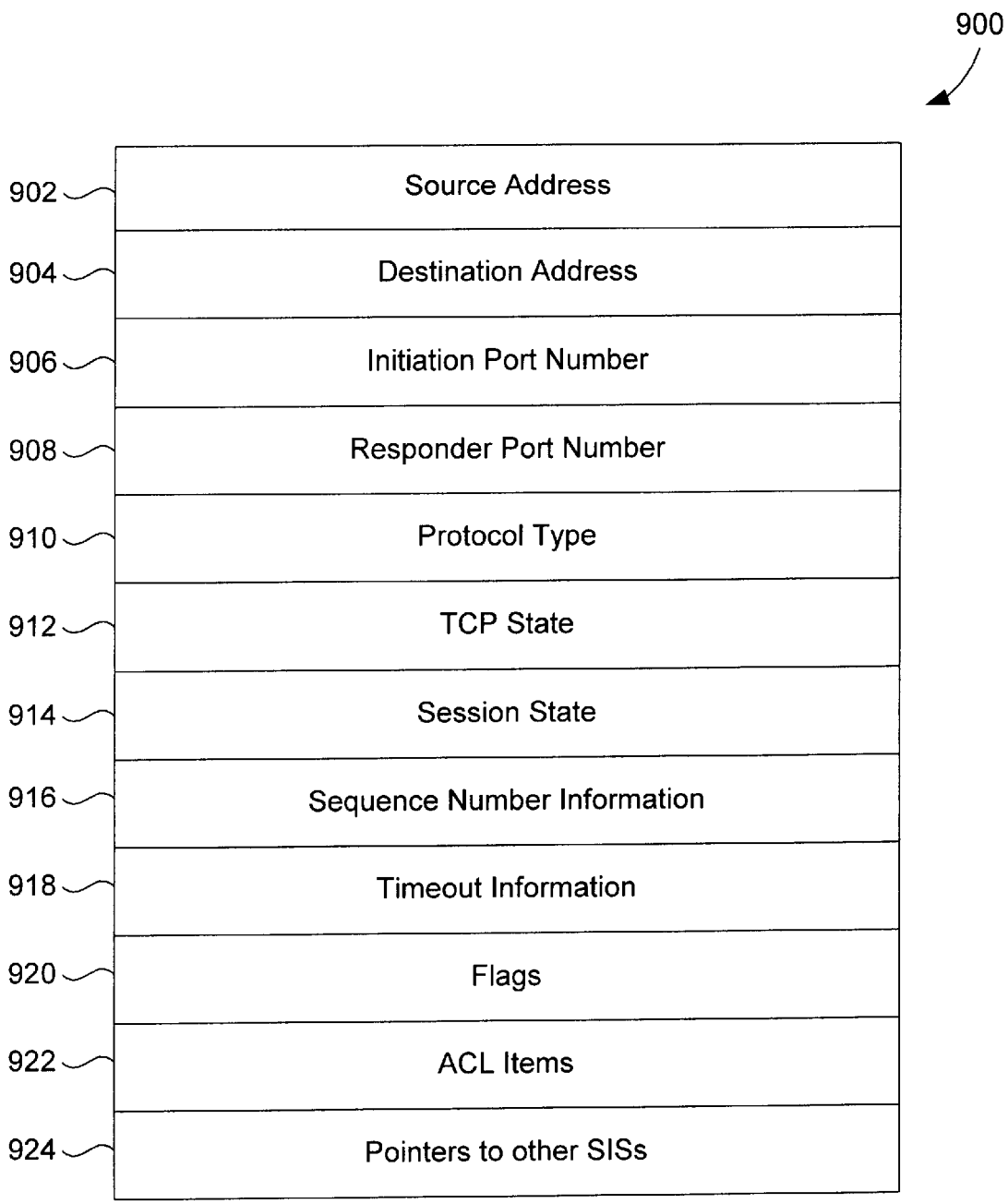
FIG. 9 is diagram of a State Information Structure (a data structure) used in a preferred implementation of this invention.

FIG. 9 depicts one example of a SIS 900 that may be used with this invention. The SIS includes various fields for use in monitoring a particular session. In SIS 900, these fields include source and destination addresses 902 and 904 and ports 906 and 908 defining a socket pair, a protocol type 910 (e.g., UDP or TCP), a TCP state 912 (as defined by the TCP standard), a session state 914 as described above (e.g., closed, opening, open, closing for TCP; opening, open, and closed for UDP), sequence information 916 including the sequence numbers of the initiator's and responder's most recent packets and the size of the sequence window for the initiator and responder, timeout information 918 specifying timestamps on the most recent packet or packets in the session and relevant timeout period, various flags 920 (for e.g. inspecting at the process level, inspecting the TCP packet order, inspecting the TCP termination sequence, inspecting Network Address Translation information, inspecting the payload, etc.), a list of ACL items 922 associated with the session (dynamically created), and pointers 924 to other sessions (SISs) that form part of the same application conversation. Regarding the last of these (pointers to other sessions), note that a given application conversation such as FTP or H.323 may have multiple channels (each defined by a separate session or TCP connection). The firewall often needs to check on the status of a related session in order to make a decision about a packet in a different session.

While not illustrated in FIG. 9, the SIS may also include alternative addresses and port numbers that may be used with a local network employing Network Address Translation. Network Address Translation (NAT) enhances network privacy by hiding internal addresses from public view. It also reduces cost of Internet access by enabling conversation of registered IP addresses. Network Address Translation is described in K. Egevang and P. Francis, "The IP Network Address Translator (NAT)," RFC 1631, Cray Communications, NTT, May 1994 which is incorporated herein by reference for all purposes.

4. Example

Figure 10A:
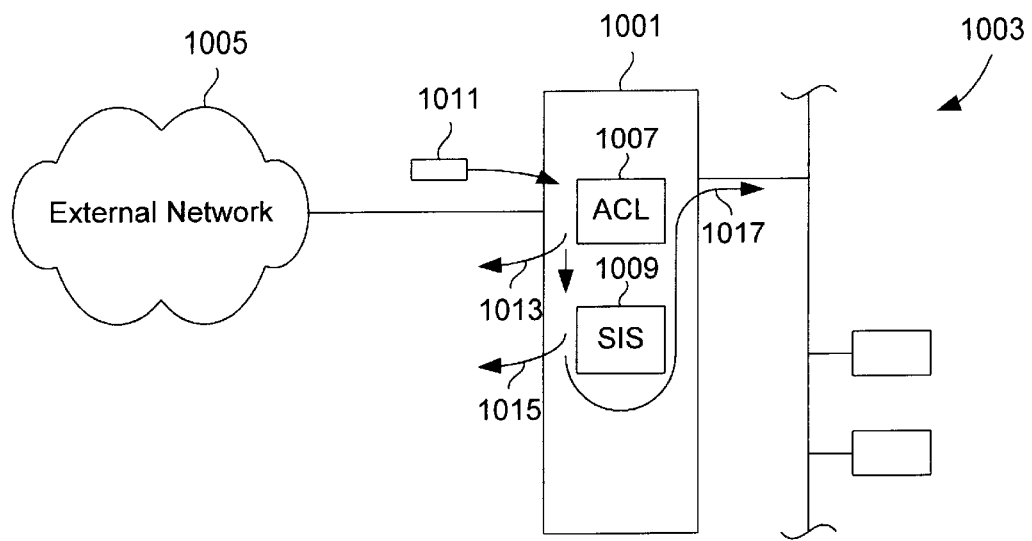
FIGS. 10A–10C depict an FTP session using a firewall/router in accordance with an embodiment of this invention.
Figure 10B:
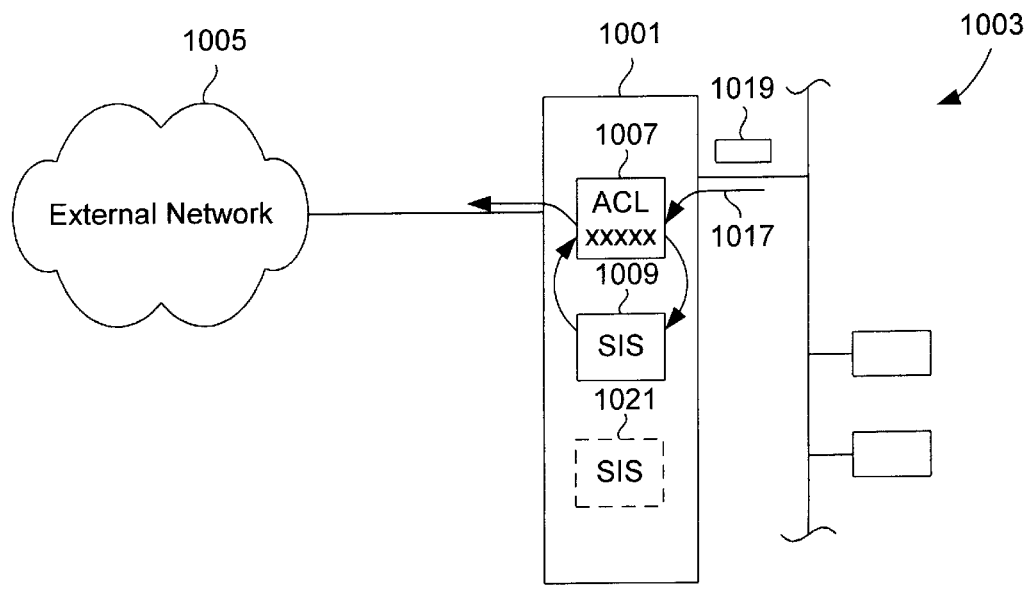
Figure 10C:
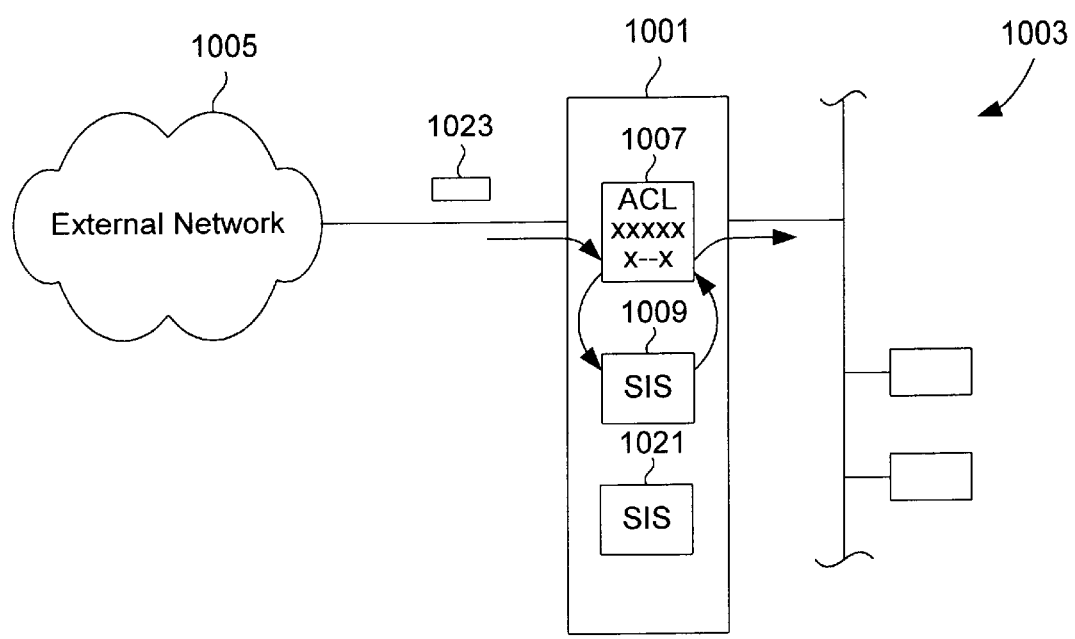

FIGS. 10A through 10C illustrate how the present invention may be employed to control an FTP session. In these figures a router/firewall 1001 connects a local network 1003 to an external network 1005 (e.g., the Internet). Initially, router/firewall 1001 has received the SYN, ACK/SYN, and ACK packets necessary to establish an FTP control channel. All such packets had to meet criteria specified in an ACL 1007. Upon receipt of the SYN packet, firewall/router 1001 created an SIS 1009 for the FTP control channel.

As shown in FIG. 10A, a packet 1011 from external network 1005 enters firewall/router 1001 through an interface and must have its header checked against ACL 1007. If it does not meet the specified by ACL 1007, it is dropped as indicated by arrow 1013. As the packet is for the FTP control channel, it must also meet criteria associated with SIS 1009 (state, sequence number, etc.). If it does not meet these criteria, it is dropped as indicated by arrow 1015. In this case, it passes as indicated by arrow 1017. Along the way, SIS 1009 is updated with information from packet 1011 (sequence number, state, etc.).

Next, as illustrated in FIF. 10B, an FTP packet 1019 with a port negotiation command is received from local network 1003. Because it contains a port negotiation command, firewall/router 1001 opens a pre-gen SIS 1021 to prepare for the new data channel. It also adds appropriate ACL items to ACL 1007 in anticipation of the new data channel. These items specify a first port number for the new data channel as identified in with the port negotiation command. This allows return traffic over the new channel.

Then, as illustrated in FIG. 1 OC, the first data packet for the new channel (packet 1023) arrives from external network 1005. Because ACL 1007 has been modified to allow it through, it passes to inspection per pre-gen SIS 1021, which is now converted to a regular SIS. In addition, the second port number for the data channel appears in the header of packet 1023. This information is used to modify the appropriate item(s) in ACL 1007 pertaining to the FTP data channel.

Data for the FTP data channel continues to flow across firewall/router 1001 so long as it meets the various requirements of ACL 1007 and SIS 1021. Eventually, the connection associated with the channel is terminated and SIS 1021 is removed. The dynamically created ACL items associated with the channel are also removed from ACL 1007.

5. Other Embodiments

Although the foregoing invention has been described in some detail for purposes of clarity of understanding, it will be apparent that certain changes and modifications may be practiced within the scope of the appended claims. For example, the local network described above may be a single local area network or multiple local area networks connected as a wide area network. Further, the security algorithm described above may be applied to a single machine as well as a network.

What is claimed is:

1. A method, implemented on a dedicated network device which receives and transmits network traffic, for limiting access to a local network, the method comprising:

receiving a packet at the network device;

identifying an application associated with the packet;

determining whether to examine the payload of the packet based on whether certain conditions are met; and examining the packet payload based on the determination.

2. The method of claim 1, wherein determining whether to examine the payload comprises determining whether the payload may contain an intrusion signature.

3. The method of claim 1, wherein determining whether to examine the payload comprises determining whether the packet is an FTP packet, an RPC packet, a TFTP packet, or a SMTP packet; and wherein examining the packet payload identifies the presence or absence of an intrusion signature.

4. The method of claim 1, wherein determining whether to examine the payload comprises determining whether an additional channel of unknown port number may be opened.

5. The method of claim 4, wherein examining the packet payload comprises examining the payload to identify a port negotiation command.

6. The method of claim 5, further comprising modifying the network device to allow packets associated with the additional channel to pass.

7. The method of claim 6, wherein the packets are allowed to pass by dynamically modifying an access control list to create a path for the additional channel.

8. The method of claim 1, further comprising:

examining the packet's header; and determining whether information in the packet header corresponds to an access control item.

9. The method of claim 8, further comprising dynamically adjusting a list of access control items based upon examination of the packet payload.

10. The method of claim 1, further comprising:

identifying a session associated with the packet;

determining whether the packet has been received after a predetermined time out period has elapsed since the last packet of the session was received; and if the predetermined time out period has elapsed, rejecting the packet.

11. A computer program product comprising a computer readable medium on which is stored program instructions for a method, implemented on a dedicated network device which receives and transmits network traffic, the method limiting access to a local network, and comprising:

receiving a packet at a network device;

identifying an application associated with the packet;

determining whether to examine the payload of the packet based on whether certain conditions are met; and examining the packet payload based on the determination.

12. The computer program product of claim 11, wherein the instructions for determining whether to examine the payload comprise instructions for determining whether an additional channel of unknown port number may be opened in the application associated with the packet.

13. The computer program product of claim 11, wherein the program instructions further specify:

identifying a session associated with the packet;

determining whether the packet has been received after a predetermined time out period has elapsed since the last packet of the session was received; and if the predetermined time out period has elapsed, rejecting the packet.

14. A dedicated network device which receives and transmits network traffic and capable of controlling access to a local network, the network device comprising:

multiple interfaces configured to connect with distinct networks or network segments;

a memory or memories configured to store (i) one or more access control criteria for allowing or disallowing a packet based upon header information and (ii) information specifying an application conversation; and a processor configured to compare packet header information with the access control criteria and could determine whether to examine packet payloads based upon the context of the application conversation.

15. The network device of claim 14, wherein the network device is a router or a switch.

16. The network device of claim 14, wherein the memory is configured to store the access control criteria in the form of an access control list.

17. The network device of claim 14, wherein the memory is configured to store the state of at least one of a TCP session and a UDP session.

18. The network device of claim 14, wherein the memory is configured with information specifying the context of an application conversation indicating whether a side channel may be opened for the application.

19. The network device of claim 14, wherein the processor is configured to examine packet payloads when context information in the memory indicates that a side channel may be opened.

20. The network device of claim 19, wherein the processor is configured to dynamically modify the access control criteria when a new side channel opens.

21. The network device of claim 14, further comprising an operating system controlling the network device to perform functions necessary to control access to the local network and route network traffic.

22. The network device of claim 14, wherein the network device comprises at least two processors, at least one of which is associated with one of the multiple interfaces.

23. A method implemented on a computer or dedicated network device for controlling access to a local network, the method comprising:
   receiving a packet;
   determining whether the packet possesses a predefined source or destination address or port;
   determining whether the packet meets criteria for a current state of a TCP or UDP session with which it is associated;
   determining whether to examine the packet's payload based on whether certain conditions are met; and
   examining the packet's payload based on the determination.

24. The method of claim 23, further comprising determining whether the packet sequence number falls within a defined sequence window.

25. The method of claim 23, further comprising;
   determining whether the packet has been received after a predetermined timeout period has elapsed since the last packet of the session was received; and
   if the predetermined timeout period has elapsed, rejecting the packet.

26. The method of claim 23, wherein determining whether the packet possesses the predetermined source or destination address or port comprises matching information in the packet header against information in an access control list.

27. The method of claim 23, wherein determining whether the packet meets criteria for a current state comprises determining whether any state transition associated with a TCP or UDP session follows an expected sequence of state transitions.

28. The method of claim 23, wherein determining whether to examine the payload comprises determining whether the payload may contain an intrusion signature.

29. The method of claim 23, wherein determining whether to examine the payload comprises determining whether the packet is an FTP packet, an RPC, a TFTP packet, or a SMTP packet; and
   wherein examining the packet payload identifies the presence or absence of an intrusion signature.

30. The method of claim 23, wherein determining whether to examine the payload comprises determining whether an additional channel of unkown port number may be opened.

31. The method of claim 30, wherein examining the packet payload comprises examining the payload to identify a port negotiation command.

32. The method of claim 31, further comprising modifying the network device to allow packets associated with the additional channel to pass.

33. The method of claim 32, wherein the packets are allowed to pass by dynamically modifying an access control list to create a path for the additional channel.

34. The method of claim 31, wherein the packet initiates a new session, the method further comprising:
   creating a state entry for the new session; and
   creating one or more access control items allowing passage of packets from a node identified in the packet initiating the new session.

35. A computer program product comprising a computer readable medium on which are stored computer program instructions for a method of controlling access to a local network, the computer program instructions specifying;
   receiving a packet;
   determining whether the packet possesses a predefined source or destination address or port;
   determining whether the packet meets criteria for a current state of a TCP or UDP session with which it is associated;
   determining whether to examine the packet's payload based on whether certain conditions are met; and
   examining the packet's payload based on the determination.

36. The computer program product of claim 35, wherein the instructions for determining whether the packet meets criteria for the current state comprises instructions for determining whether any state transition associated with the TCP or UDP session follows an expected sequence of state transitions.

37. The computer program product of claim 35, wherein the program instructions further specify;
   determining whether the packet initiates a new session;
   creating a state entry for the new session; and
   creating one or more access control items allowing passage of packets from a node identified in the packet initiating the new session.

* * * * *